US005534059A

United States Patent [19]
Immordino, Jr.

[11] Patent Number: 5,534,059
[45] Date of Patent: Jul. 9, 1996

[54] MACHINABLE PLASTER

[75] Inventor: Salvatore C. Immordino, Jr., Streamwood, Ill.

[73] Assignee: United States Gypsum Co., Chicago, Ill.

[21] Appl. No.: 372,484

[22] Filed: Mar. 20, 1995

[51] Int. Cl.$^6$ .................................................. C04B 11/00
[52] U.S. Cl. ............................ 106/778; 106/772; 524/423
[58] Field of Search ..................................... 106/772, 778, 106/782; 524/423

[56] References Cited

U.S. PATENT DOCUMENTS

| | | | |
|---|---|---|---|
| 4,174,230 | 11/1979 | Hashimoto et al. | 106/780 |
| 4,286,995 | 9/1981 | Smith et al. | 106/774 |
| 4,363,667 | 12/1982 | Birchall et al. | 106/784 |
| 5,075,358 | 12/1991 | Riley et al. | 106/778 |
| 5,108,679 | 4/1992 | Rirsch et al. | 106/782 |
| 5,118,751 | 6/1992 | Schulze et al. | 524/503 |
| 5,151,130 | 9/1992 | Croft et al. | 106/778 |
| 5,240,500 | 8/1993 | Retti | 106/778 |
| 5,288,775 | 2/1994 | Bischoff et al. | 524/2 |
| 5,305,577 | 4/1994 | Richards et al. | 52/799 |
| 5,336,318 | 8/1994 | Attard et al. | 106/778 |
| 5,441,585 | 8/1995 | Rodda et al. | 106/778 |

*Primary Examiner*—Karl Group
*Assistant Examiner*—Michael Marcheschi
*Attorney, Agent, or Firm*—John M. Lorenzen; David F. Janci

[57] ABSTRACT

This invention is a polymer modified, high density gypsum composition that is useful as a machinable plaster. For example, the machinable plaster can be used with computer aided carving machines for modeling in the automobile industry. The polymer is a redispersable polymer such as ethylene/vinyl acetate/vinyl chloride polymer.

11 Claims, 2 Drawing Sheets

MACHINABLE PLASTER

TECHNICAL FIELD

This invention relates to machinable plaster for use in conjunction with computer aided milling machines for high performance model manufacture. The plaster is a polymer modified, gypsum based material, which when cast into a block forms a uniform machinable substrate.

BACKGROUND ART

Conventional plasters have been used for a long time for pattern, model and mold making. Until recently, there was only one material, commonly known as "plaster of Paris". However, "plaster of Paris" does not meet the requirement for dimensionally accurate, automated CNC-machined master patterns and prototypes. More recently, various new materials have been developed in attempts to meet the particular requirements for a viable machinable substrate established by these computer aided carving machines. These include a number of plastic, polyurethane foam board, epoxy wood, machinable wax, monolithic graphite, and ceramic materials. Many of these products, however, are not user or environmentally friendly, and are very costly. Plastics, foams, ceramics, and graphite based products cannot be easily repaired or remodeled, and have a tendency to generate dust when machined. Also, many of these materials need to be disposed of properly as they may create landfill problems.

Therefore, a need still exists for a better material for use in conjunction with computer aided milling machines for precise master model or pattern manufacture. A suitable material must be dimensionally stable from room temperature through 250° F., readily carvable, and able to hold a sharp edge and smooth contour. It should also be environmentally and user friendly, and generate little or no dust when machined.

DISCLOSURE OF INVENTION

I now have developed a polymer modified, gypsum based, machinable material especially well suited for use in conjunction with computer-aided milling machines and other cutting equipment.

My formulation includes in part any alpha calcium sulfate hemihydrate plaster and/or a beta calcium sulfate hemihydrate plaster. The use of this base hemihydrate plaster allows for the addition of water which is necessary to achieve a given state of plasticity that will allow the user to cast master blocks or tool blanks to customized size. Plasticity is the property of a plaster which permits permanent and continuous deformation in any direction. As opposed to low viscosity materials, plastic material requires a measurable force (yield value) to initate flow. A material of low plasticity is usually described as being "poor" or hard working; high plasticity is described in terms of "rich" or easy working. The use of an alpha hemihydrate plaster requires less water to achieve an easy working state, because the crystals, following hydration, are more closely packed, and thus form a high density composite. The combination of alpha and/or beta hemihydrates allows for the control of the machinable plaster's density and, therefore, resulting weight per given volume.

My formulation also contains a water redispersable powder polymer binder. The binder reduces the water to plaster ratio requirements (commonly referred to as consistency) which enhances the ultimate strength and dimensional stability of the set material. The binder also provides for enhanced flow and leveling properties during preparation. The binder disperses in the slurry and later interlocks throughout the resulting hydrating gypsum crystals, which increases the systems overall dry flexural and cohesive strength and promotes the production of evenly sized shavings during cutting.

A defoamer is used in the formulation in order to minimize air entrainment. A consistency reducer is added to provide better fluidity during mixing and to give the base gypsum a consistency close to theoretical, in that it requires only slightly more water than necessary for the hemihydrate to chemically convert to dihydrate. A starch is added to prevent agglomeration of the polymer during milling.

Other additives may be incorporated in my formulation as deemed desirable. For example, a filler may be added to change the overall density. Glycerin, boric acid or other materials may be added as calcination inhibitors. A high purity, finely ground, raw gypsum or potassium sulfate or other known accelerators may be used to accelerate the setting time. A high purity finely ground natural graphite or other similar material may be added as as internal lubricating agent. Finally, a proteinaceous retarder, sodium titrate or similar retarder may be used to lengthen the setting time of the formula. Proteinaceous materials include casein, soya protein and the like.

My polymer modified gypsum based material is dimensionally stable from room temperature through 250° F. It is also readily carvable and able to hold a sharp edge and smooth contour. The machinable plaster cast comprises hydrated calcium sulfate crystals and the powder binder coats the crystals and interlocks the crystals together. It is also environmentally and user friendly, and does not generate dust when machined. Therefore, unlike the machinable materials currently in the marketplace, my material meets all the requirements for a material suitable for use with computer-aided, and other precision, machining apparatus.

BEST MODE OF CARRYING OUT INVENTION

Figure 1:
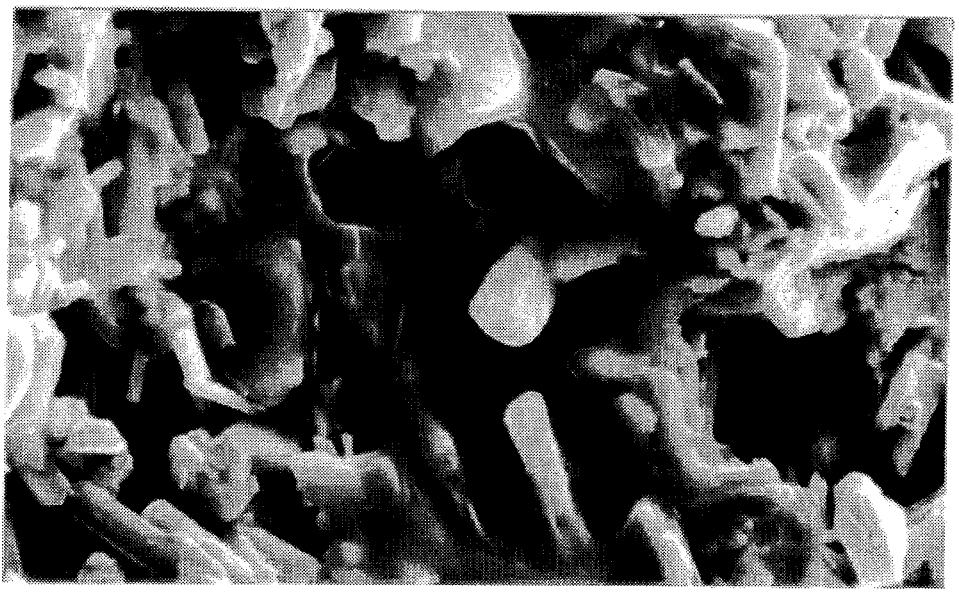
FIG. 1 is a scanning electron microscope (SEM) photograph at 1500X of a machinable plaster according to this invention.

The gypsum base material I employ in my formulation can be calcium sulfate hemihydrate ($\alpha$-$CaSO_4 \cdot \frac{1}{2}H_2O$), calcium sulfate beta hemihydrate ($\beta$-$CaSO_4 \cdot \frac{1}{2}H_2O$) or a mixture thereof.

Successful mixing and use of these compositions require following specific standards and procedures. An ideal plaster mix is one in which the plaster particles are completely dispersed in the water to produce a uniform, homogenous slurry. Special care should be taken to control variables such as batch size, mixer design, mixing time, water purity and temperature and the use of additives.

Water used in mixing this plaster should be as pure as possible. In many cases, water for industrial use is taken from contaminated sources and is high in organic impurities that will lengthen the setting time of the plaster. Large amounts of soluble salts such as sodium chloride, sodium sulfate, and magnesium sulfate in the water can migrate to the surface of the composite during drying. The resulting efflorescence forms hard spots on the surface of the composite piece and may result in a less than ideal surface when cut. Other chemicals in the water may react with the gypsum to produce these soluble salts. In general, any compound which has a greater solubility than gypsum can produce efflorescence.

Since gypsum has maximum solubility at about 110° F., variations in water temperature will affect setting time. A controlled-set condition resulting from use of water at a uniform temperature is recommended. Wide variations in water temperature can be corrected by using a tempering tank to balance extreme temperature differences. Tank types can range from an automatic system which blends hot and cold water, to a simple container warmed by waste heat or by air temperature in the shop.

A fundamental property of any plaster is its normal consistency. Consistency is expressed as the amount of water required to mix with 100 parts plaster (by weight) to achieve a standard fluidity. Variations in water-to-plaster ratio will also affect resulting density, absorption, and strength. The best method of determining wet density of a plaster is to mix a carefully weighed batch at a pre-determined consistency. Immediately after mixing, a known volume of this batch should be weighed to determine slurry density at the proper consistency. Subsequent mixes should closely duplicate slurry density of the original batch. Selection of the water-to-plaster ratio must be based on the particular formula design.

When manufactured, plaster particles are surrounded by an envelope of air. Part of this air is removed from the plaster during shipping and in handling; part during soaking. In addition to removing air, soaking allows each plaster particle to be completely saturated with water so that it is easier to disperse. Plaster with good soaking properties will sink slowly into the water and become almost completely wetted after 2 or 3 minutes. Shortcuts in soaking will influence effectiveness of the mixing period and, subsequently, the quality of the finished machinable cast.

Mixing the plaster slurry is a very important step in producing a machinable plaster cast with maximum strength and desired density. Density, hardness, strength and durability of set gypsum are all intimately related to the quality of the mix. Mixing disperses plaster particles in the water. The strength of the machinable plaster cast is partially determined in mixing since there is a direct relationship between energy input during mixing and strength development of the cast. Care must be taken, however, to cease mixing before hydration of the calcium sulfate begins. A change in mixing procedure may have a greater effect on the finished product than any other phase of the entire operation. Generally, batch size should permit pouring to be completed no later than 5 minutes after the slurry has been mixed.

To mix plaster properly for uniform machinable casts, the user should follow conventional mixing procedures except that special care should be taken to avoid entraining air. Sift or strew plaster into water slowly and evenly. Do not drop handfuls of plaster directly into water. For best results, use a highspeed direct-drive propeller mixer with mixing shaft set at an angle of 15° from vertical. The propeller should clear bottom of container by 1 to 2 in. and the shaft should be about halfway between center and side of the container. Propeller rotation should force mix downward. Normally, the machinable media cast can be removed from the mold within 35 to 60 minutes after set has occurred.

The polymers I employ are free flowing, water redispersable powders. Preferably, the polymers are ethylene, vinyl acetate, vinyl chloride and/or polyvinyl alcohol polymers. Typically, the polymer may be a blend of ethylene, vinyl acetate copolymer with polyvinyl chloride. The polymer also may be a terpolymer of ethylene, vinyl acetate and vinyl chloride prepared by emulsion polymerization. It also could be a copolymer of vinyl acetate and ethylene copolymerized in the presence of PVC.

The vinyl chloride resins I employ include the graft copolymers, the ungrafted homopolymers and copolymers and postchlorinated polyvinyl chlorides. As graft and random copolymers, the polyvinyl chloride component of the instant resin blends can contain up to 25 weight percent of one or more other interpolymerized ethylenically unsaturated monomers copolymerizable with vinyl chloride.

The preferred polyvinyl chloride resins herein are vinyl chloride copolymer homopolymers containing at least about 95 percent polymerized vinyl chloride. The PVC can also contain up to 5 weight percent of copolymerizable monomer such as vinylidene halide; a vinyl ester, e.g., vinyl acetate; acrylic and alphaalkyl acrylic acids, e.g., acrylic acid and methacrylic acid; an alkyl ester of such an acid, e.g., methyl acrylate, ethyl acrylate, methyl methacrylate; an amide of such an acid, e.g., acrylonitrile, methacrylonitrile, ethacrylonitrile; a vinyl aromatic, e.g., styrene and alpha-alkyl styrene; dialkyl esters of maleic acid, e.g. dimethyl maleate and the corresponding fumarates; vinyl alkyl ethers and ketones, and various other ethylenically unsaturated compounds copolymerizable vinyl chloride.

The vinyl acetate-ethylene copolymers which are useful in this invention are copolymers of ethylene and vinyl acetate in a ratio of about 60:40 to about 25:75. The copolymers are a well known type of resin which can be prepared by any of the known and conventional polymerization techniques. The copolymers can be crosslinked. The vinyl acetate ethylene copolymers also may contain one or several monomers copolymerizable with vinyl acetate and ethylene generally not to exceed about 10 percent of the copolymer. Thus, for example, the vinyl acetate ethylene copolymers can be prepared to include modifying termonomers such as (meth)acrylate ester, e.g., ethyl acrylate, butyl methacrylate, 2 hydroxy ethyl acrylate, and the like; vinyl esters, e.g., vinyl stearate, vinyl versatate, vinyl benzoate, and the like, vinyl ethers, e.g., ethyl vinyl ether, hexyl vinyl ether, and the like; and carbon monoxide.

My machinable plaster may also contain one or more setting accelerators, setting expansion inhibitors, one or more wetting agents in an amount of 0–5 weight percent, preferably 0–3 weight percent, more preferably 0.1–1 weight percent, such as liquid hydrophobic hydrocarbons, liquid hydrophobic fatty acid esters or liquid hydrophobic fatty acids or one or more anionic surface active agents such as alkylbenzene sulfonates, alkyl sulfates or bisulfites, a filler in an amount of 0–2 weight percent, preferably 0–10 weight percent, more preferably 1–5 weight percent or a consistency reducer. Preferably, the machinable plaster also contains a starch such as cornstarch, to prevent agglomeration or gumming of the polymer.

The following example further describes a formulation for a machinable plaster in accordance with my invention.

Example I

| Chemical Name | Percent by Weight | Vendor |
|---|---|---|
| Calcium Sulfate Hemihydrate | 50–90 | United States Gypsum Company |
| Ethylene/Vinyl Acetate/Vinyl Chloride Terpolymer | 5–25* | National Starch and Chemical Company or Air Products and Chemicals |
| Polyvinylalcohol | 5–25* | National Starch and Chemical Company or Air Products and Chemicals |
| Ethylene/Vinyl Acetate Copolymer | 5–25* | National Starch and Chemical Company or Air Products and Chemicals |
| Polyvinylacetate Homopolymer | 5–25* | National Starch and Company or Air Products and Chemicals |
| Defoamer | 0–1 | |
| Wetting Agent | 0–5 | |
| Filler | 0–20 | |

*If employed in the machinable plaster.

Example II

Preferably, the machinable plaster composition is a mixture of:

| Chemical | Percent by Weight |
|---|---|
| Calcium Sulfate Hemihydrate | 80–90 |
| Ethylene/Vinyl Acetate/Vinyl Chloride Terpolymer | 10–20 |
| Defoamer | 0–1 |
| Wetting Agent | 0–3 |
| Filler | 0–10 |

Example III

Polymer-gypsum matrix plaster cubes were prepared from a formulation consistent with Example II which comprised 82 to 84 percent by weight calcium sulfate hemihydrate and 12 to 14 percent by weight ethylene/vinyl acetate/vinyl chloride terpolymer. The samples also contained the following materials in percent by weight:

| | |
|---|---|
| Defoamer | 0.1–0.3 |
| Melamine Formaldehyde-Sodium Bisulfite | 0.1–1.0 |
| Cornstarch | 1–5 |

The following tables demonstrate the formula's unique physical properties.

TABLE I

| Physical Test | Units |
|---|---|
| Normal Consistency | 20–30 cc |
| Vicat Set | 30–40 min. |
| Wet Density | 107–112 lbs/ft$^3$ |
| Dry Density | 98–103 lbs/ft$^3$ |
| 1 Hour Compressive Strength | 1000–2000 PSI |
| Dry Compressive Strength | 3500–5000 PSI |
| Dry Tensile Splitting Strength | 500–1000 PSI |
| 1 Hour Surface Hardness* | 22 kg |
| Dry Surface Hardness* | 76.9 kg |
| Dry Impact Strength | 8000–9000 g.cm |
| Dry Tensile Strength | 1000–1500 PSI |

*Measured by a Monotron Hardness Gauge.

Many of the physical properties vary depending on the normal consistency of the wet mixture, as indicated by the ranges of units for those properties in Table I. For a more specific example, the following Table II sets forth the values for a formula mix having a normal consistency of 25 cc.

TABLE II

| Physical Test | Units |
|---|---|
| Normal Consistency | 25 cc |
| Vicat Set | 31 min. |
| Wet Density | 107 |
| Dry Density | 98 |
| 1 Hour Compressive Strength | 1500 PSI |
| Dry Compressive Strength | 3600 PSI |
| Dry Tensile Splitting Strength | 500 |
| 1 Hour Surface Hardness* | 22 kg |
| Dry Surface Hardness* | 76.9 kg |
| Dry Impact Strength | 8000 g.cm |
| Dry Tensile Strength | 1000 PSI |

*Measured by a Monotron Hardness Gauge.

The gypsum-polymer composite cubes were examined with the scanning electron microscope (SEM) to determine how completely the polymer was coating the gypsum needles. The compositions of the 2" cubes were those of Example III. A corner was chipped off each cube and the internal surface was examined.

Figure 2:
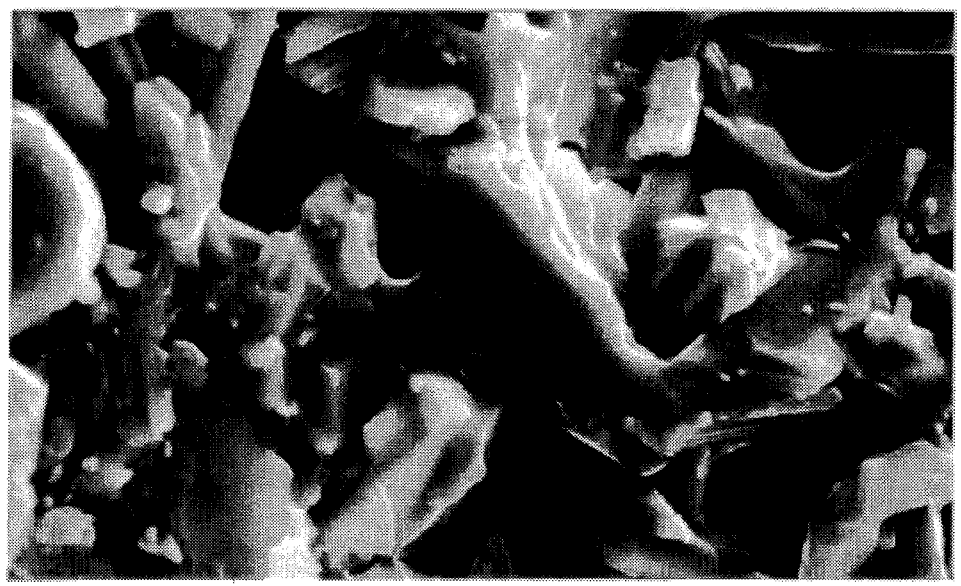
FIG. 2 is a scanning electron microscope (SEM) photograph at 2000X of the machinable plaster.
Figure 3:
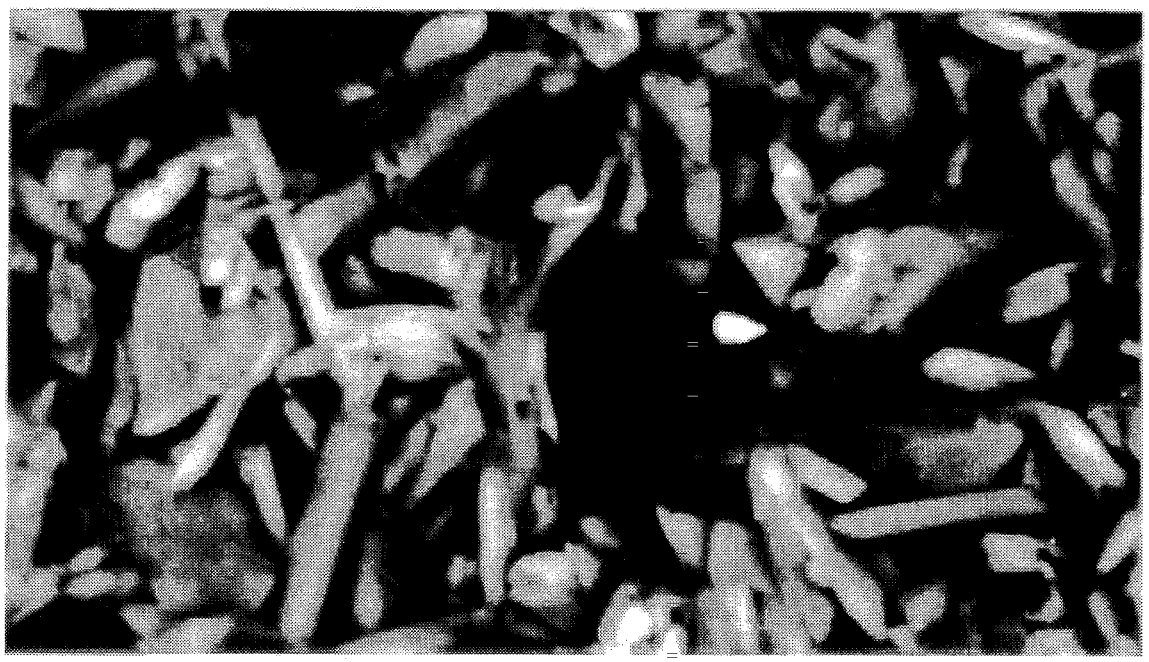
FIG. 3 is a backscatter image of the machinable plaster showing that the smooth coating on the gypsum is polymer.

FIG. 1 shows the polymer-gypsum matrix. The polymer coating is evident throughout the matrix. Localized concentrations of polymer are shown at 1500X in FIG. 1 and 2000X in FIG. 2. The backscatter image (BSI) showed that the smooth coating on the gypsum needles was polymer. BSI showed the gypsum needles under the coating as shown in FIG. 3. With backscatter imaging, the material composed of lighter elements (C,N,O,H) appears dark, while the heavier elements (Ca,S,Si) appears light. In the backscatter image, the gypsum is light and the polymer dark.

My polymer modified, high density, gypsum based material is dimensionally stable from room temperature through 250° F., carvable even with hand cutting tools and will hold a sharp edge and smooth contour when machined. My material is also environmentally friendly because its components are nontoxic.

I claim:

1. A gypsum composition for machinable plaster comprising a mixture of 50 to 90 percent by weight of calcium sulfate hemihydrate, 1 to 5 percent by weight of a starch, and 5 to 25 percent by weight of a free flowing, water redispersable powder polymer binder wherein the composition forms a machinable cast that is dimensionally stable from room temperature through 250° F. and able to hold a sharp edge and smooth contour and wherein the machinable cast comprises hydrated calcium sulfate crystals and wherein the powder binder coats the crystals and interlocks the crystals together.

2. A gypsum composition for machinable plaster comprising a mixture of 50 to 90 percent by weight of calcium sulfate hemihydrate, 1 to 5 percent by weight of a starch, and 5 to 25 percent by weight of a water redispersable powder polymer binder of ethylene vinyl acetate copolymer, wherein the composition forms a machinable cast composing hydrated calcium sulfate crystals that is dimensionally stable from room temperature through 250° F. and able to hold a sharp edge and smooth contour, and wherein the powder binder bonds the crystals of the cast together.

3. A gypsum composition according to claim 1 wherein the composition contains 80 to 90 percent by weight of hemihydrate and 10 to 20 percent by weight of the redispersable polymer.

4. A gypsum composition according to claim 1 wherein the hemihydrate is alpha gypsum hemihydrate, beta gypsum hemihydrate or a mixture thereof.

5. A gypsum composition according to claim 1 wherein the redispersable polymer is an ethylene/vinyl acetate/vinyl chloride terpolymer.

6. A gypsum composition according to claim 1 optionally including 0 to 1 weight percent of a defoamer, a consistency reducer, 0 to 5 weight percent of a wetting agent or 0 to 20 weight percent of a filler.

7. A gypsum composition according to claim 1 including 0 to 1 weight percent of at least one defoamer, 0 to 5 weight percent of at least one wetting agent and 0 to 20 weight percent of at least one filler.

8. A gypsum composition according to claim 1 comprising a mixture of:

| Chemical | [Parts] Percent by Weight |
| --- | --- |
| Calcium Sulfate | 50–90 |
| Ethylene/Vinyl Acetate/Vinyl Chloride Terpolymer | 5–25 |
| Defoamer | 0–1 |
| Wetting Agent | 0–5 |
| Filler | 0–20 |

9. A gypsum condition according to claim 1 comprising a mixture of:

| Chemical | [Parts] Percent by Weight |
| --- | --- |
| Calcium Sulfate | 80–90 |
| Ethylene Vinyl Acetate, Vinyl Chloride Terpolymer | 10–20 |
| Defoamer | 0–1 |
| Wetting Agent | 0–3 |
| Filler | 0–10 |

10. A gypsum composition according to claim 1 comprising a mixture of:

| Chemical | [Parts] Percent by Weight |
| --- | --- |
| Calcium Sulfate | 82–84 |
| Ethylene/Vinyl Acetate/Vinyl Chloride Terpolymer | 12–14 |
| Defoamer | 0.1–0.3 |
| Wetting Agent | 0.1–1.0 |
| Filler | 1–5 |

11. A gypsum composition according to claim 1 wherein the redispersable polymer is a acetate/vinyl versatate/vinyl terpolymer.

* * * * *